United States Patent
Yang et al.

(10) Patent No.: US 9,777,205 B2
(45) Date of Patent: Oct. 3, 2017

(54) THERMAL GREASE BASED ON HYPERBRANCHED OLEFINIC FLUID

(71) Applicant: Dow Global Technologies LLC, Midland, MI (US)

(72) Inventors: Yunfeng Yang, Shanghai (CN); Hongyu Chen, Zhanjiang (CN); Brad C. Bailey, Midland, MI (US); Mohamed Esseghir, Collegeville, PA (US); Suh Joon Han, Schwenksville, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/501,878

(22) PCT Filed: Sep. 22, 2014

(86) PCT No.: PCT/CN2014/087083
§ 371 (c)(1),
(2) Date: Feb. 6, 2017

(87) PCT Pub. No.: WO2016/004975
PCT Pub. Date: Mar. 31, 2016

(65) Prior Publication Data
US 2017/0226396 A1     Aug. 10, 2017

(51) Int. Cl.
| | | |
|---|---|---|
| C10M 125/04 | (2006.01) | |
| C07F 15/00 | (2006.01) | |
| C07F 7/00 | (2006.01) | |
| C07F 7/28 | (2006.01) | |
| C09K 5/10 | (2006.01) | |
| C08K 3/22 | (2006.01) | |
| C08K 3/28 | (2006.01) | |

(52) U.S. Cl.
CPC .............. C09K 5/10 (2013.01); C08K 3/22 (2013.01); C08K 3/28 (2013.01); *C08K 2003/2227* (2013.01); *C08K 2003/2296* (2013.01); *C08K 2003/282* (2013.01)

(58) Field of Classification Search
CPC ..... C10M 105/00; C10M 107/02; C07C 2/34; C08F 10/00; B01J 31/00
USPC .......................... 508/150; 556/21, 51, 54, 56
See application file for complete search history.

(56) References Cited

U.S. PATENT DOCUMENTS

| | | |
|---|---|---|
| 6,656,389 B2 | 12/2003 | Iruvanti et al. |
| 8,609,794 B2 | 12/2013 | Klosin et al. |
| 2003/0087773 A1* | 5/2003 | Egawa ............... C08F 210/16 508/591 |
| 2007/0031684 A1 | 2/2007 | Anderson et al. |
| 2008/0004191 A1 | 1/2008 | Ishigaki |
| 2014/0190452 A1 | 7/2014 | Ikeda et al. |
| 2014/0240928 A1 | 8/2014 | Tien et al. |
| 2014/0330056 A1 | 11/2014 | Klosin et al. |

FOREIGN PATENT DOCUMENTS

| | | |
|---|---|---|
| CN | 1928039 A | 3/2007 |
| EP | 823451 A1 | 2/1998 |
| EP | 939115 A1 | 9/1999 |
| EP | 982392 A1 | 3/2000 |
| WO | 2013101376 A1 | 7/2013 |
| WO | 2014209927 A1 | 12/2014 |

OTHER PUBLICATIONS

Spaleck, et al., The Influence of Aromatic Substituents on the Polymerization Behavior of Bridged Zirconocene Catalysts, Organometallics, 1994, pp. 954-963, vol. 13.
Stehling, et al., ansa-Zirconocene Polymerization Catalysts with Annelated Ring Ligands-Effects on Catalytic Activity and Polymer Chain Lengths, Organometallics, 1994, pp. 964-970, vol. 13.
Braunschweig, et al., Constrained Geometry Complexes-Synthesis and Applications, Coordination Chemistry Reviews <http://en.wikipedia.org/w/index.php?title=Coordination_Chemistry_Reviews&action=edit&redlink=1>, 2006, 2691-2720, 250.
International Search Report and Written Opinion for PCT/CN2014/087083, Jun. 2, 2015, pp. 1-7.
International Preliminary Report on Patentability for PCT/CN2014/087083, Mar. 28, 2017, pp. 1-4.

* cited by examiner

Primary Examiner — Vishal Vasisth

(57) ABSTRACT

Disclosed is an effective thermal grease comprising a hyperbranched olefinic fluid and a thermally conductive filler. Property-modifying additives and fillers may also be included. The hyperbranched olefinic fluid is selected to have an average of at least 1.5 methine carbons per oligomer molecule and at least 40 methine carbons per one thousand total carbons. The thermal grease exhibits a flash point of 180° C. or higher, a pour point of 0° C. or lower, and a kinematic viscosity at 40° C. of no more than 200 cSt (0.0002 m 2/s). The composition may offer improved thermal conductivity, reduced tendency to migrate, and lower cost when compared with many other thermal greases, including silicone-based thermal greases.

7 Claims, No Drawings

THERMAL GREASE BASED ON HYPERBRANCHED OLEFINIC FLUID

This application is a 371 of PCT/CN2014/087083, filed Sep. 22, 2014.

The present invention relates to the field of thermal interface materials. More specifically, it relates to thermal greases incorporating hyperbranched olefinic fluids and thermally-conductive fillers.

Thermal interface materials (TIMs) play an integral role in thermal management solutions as the materials that are sandwiched between, for example, heat-generating semiconductor components, such as integrated circuits or transistors, and heat sinks, heat spreaders, and other thermal management components to improve heat transfer by filling microscopic air-gaps that are present due to the imperfectly flat and smooth surfaces of the components. TIMs come in various forms, such as grease, gels, pads, phase change materials and solders, and many of these are carbon (polymer) based. Thermal grease is one of the most important types, accounting for the largest TIMs market share. This is because, compared to other TIMs, particularly polymer-based TIMs, thermal grease often exhibits a higher effective thermal conductivity and lower thermal resistance as a result of the fact that it is being used in particularly narrow spaces between components, e.g., in so-called "thin joints" of less than 0.1 millimeter (mm).

Most thermal greases are highly filled, viscous silicone or hydrocarbon oils. Greases having silicone oil as a matrix may exhibit many desired properties, including resistance to chemical attack and wide operating temperature range. However, silicone oil is very expensive and tends to physically migrate from where it is applied, thus leading to contamination of nearby components. Furthermore, over a long term, silicone thermal grease can dry out, resulting in cracking and separation which compromise performance. To avoid such problems, non-silicone thermal greases that use synthetic or natural oils, frequently mineral oil, have been developed. However, mineral oil has a low fire point (160° C.), which limits its application in relatively high temperature devices.

Thus, researchers in the field of thermally-conductive fluids have sought less expensive ways to transfer and/or eliminate heat. One means of doing this, widely used in transformer applications, has been use of dielectric fluids. Often identification of these fluids is related to very specific applications with important property requirements.

For example, WO2013101376A1 describes a hyperbranched olefin oil-based dielectric fluid. This dielectric fluid composition comprises a poly-α-olefin or poly(co-ethylene/α-olefin) having a weight average molecular weight more than 200 and less than 10,000 Daltons. The dielectric composition exhibits a hyperbranched structure that enables low viscosity, high fire point, low pour point and desirable thermal oxidative stability.

EP823451A1 discloses thermally conductive silicone composition comprising a liquid silicone and a thermally conductive filler. In this invention the thermally conductive filler comprises an aluminum nitride powder and a zinc oxide powder.

CN1928039B discloses conductive grease comprising an inorganic powder and base oil of mineral oil or synthetic oil, wherein the inorganic powder is a combination of coarse and fine particles having a polyhedral shape.

EP939115A1 discloses a thermally conductive grease composition comprising: (A) 100 weight parts of at least one base oil selected from the group consisting of liquid silicones, liquid hydrocarbons and fluorohydrocarbon oils, and 500-1,000 weight parts of a thermally conductive filler mixture constituted of (B) an inorganic filler having a Mohs' hardness of at least 6 and a thermal conductivity of at least 100 W/m$^2$K (watts per square meter per degree Kelvin) and (C) an inorganic filler having a Mohs' hardness of at most 5 and thermal conductivity of at least 20 W/m$^2$K.

EP982392B1 discloses a thermally conductive grease composition, characterized as comprising (A) 100 parts by weight of a base oil and (B) 500 to 1,200 parts by weight of metallic aluminum powder, wherein said aluminum powder is a 9:1 to 1:9 by weight mixture of fine metallic aluminum powder having an average particle size of 0.5 to 5 μm and coarse metallic aluminum powder having an average particle size of 10 to 40 μm.

U.S. Pat. No. 6,656,389B2 discloses a thermal paste for low temperature applications comprising a thermally conductive solid filler; a dispersant; and a linear alkylbenzene liquid carrier. The linear alkylbenzene liquid carrier serves as the matrix of thermal paste (grease).

US20070031684A1 discloses a thermally conductive grease comprising 0 to about 49.5 weight percent of carrier oil; 0.5 to 25 weight percent of at least one dispersant; and at least 49.5 weight percent of thermally conductive particles, wherein the thermally conductive particles comprise a mixture of at least three size distributions of thermally conductive particles, each of the distributions of thermally conductive particles having an average (D50, mass-median-diameter, MMD) particle size which differs from the other distributions by at least a factor of 5.

US20080004191A1 discloses a thermal conductive grease comprising: (A) a base oil having a viscosity of 112 to 770 square millimeters (mm$^2$) at 40° C. and comprising a copolymer of an unsaturated dicarboxylic acid dibutyl ester and an α-olefin; and (B) a thermal conductive filler filled in the base oil. A copolymer of an unsaturated dicarboxylic acid dibutyl ester and α-olefin is required.

WO2013052375A1 discloses a thermally conductive grease comprising: a carrier oil; a dispersant; and thermally conductive particles, wherein the thermally conductive particles have a D50 (MMD) particle size of no greater than about 11 micrometers (μm), and wherein the thermally conductive particles in the thermally conductive grease contain less than about 3% by volume of particles having a particle size of 0.7 μm or less, based on a total volume of thermally conductive particles in the thermally conductive grease.

In one embodiment the present invention provides a thermal grease composition comprising an admixture of (a) a hyperbranched, ethylene-based or ethylene- and propylene-based, olefinic fluid having an average of at least 1.5 methine carbons per oligomer molecule, and having at least 40 methine carbons per one-thousand total carbons, and wherein the average number of carbons per molecule is from 25 to 200; and (b) a thermally conductive filler.

In another embodiment the present invention provides a process to prepare a thermal grease composition comprising (a) contacting together ethylene, and optionally propylene, and further optionally, an alpha-olefin, and at least one coordination-insertion catalyst, wherein the coordination-insertion catalyst is a metal-ligand complex wherein the metal is selected from zirconium, hafnium and titanium, and has an ethylene/octene reactivity ratio up to 20, and a kinetic chain length up to 20 monomer units; in a continuously-fed backmixed reactor zone under conditions such that a mixture of at least two oligomer products is formed, the mixture including (i) a first component comprising a hyperbranched oligomer having an average of at least 1.5 methine carbons per oligomer molecule, and having at least 40 methine carbons per one-thousand total carbons, and wherein at least 40 percent of the methine carbons is derived from the ethylene or, where the optional propylene is included, from the ethylene and the propylene, and wherein the average number of carbons per molecule is from 25 to 200; and (ii) a second component comprising at least one organic volatile product having an average number of carbons that is less than or equal to 14 (b) separating the organic volatile product from the hyperbranched oligomer; (c) recovering the hyperbranched oligomer; and (d) admixing the hyperbranched oligomer and a thermally conductive filler to form a thermal grease composition.

Formulas I and II represent generalized metallocene catalysts useful in the invention.

Formula III represents a generalized bis-phenylphenoxy catalyst useful in the invention.

Formula IV represents a coordination-insertion catalyst of the formula $(L)ZrMe_2$ where (L)=2',2'''-(ethane-1,2-diylbis(oxy))bis(3-(3,6-di-tert-butyl-9H-carbazol-9-yl)-5'-fluoro-3'-methyl-5-(2,4,4-trimethyl-pentan-2-yl)-[1,1'-biphenyl]-2-ol).

Formula V represents a coordination-insertion catalyst of the formula $(L)ZrMe_2$ where (L)=3-(3,6-di-tert-butyl-9H-carbazol-9-yl)-2'-(2-((3'-(3,6-di-tert-butyl-9H-carbazol-9-yl)-5-fluoro-2'-hydroxy-5'-(2,4,4-tri-methyl-pentan-2-yl)-[1,1'-biphenyl]-2-yl)oxy)ethoxy)-3',5'-difluoro-5-(2,4,4-trimethylpentan-2-yl)-[1,1'-bi-phenyl]-2-ol.

Formula VI represents a coordination-insertion catalyst of the formula $(L)ZrMe_2$ where (L)=3-(3,6-di-tert-butyl-9H-carbazol-9-yl)-2'-(2-((3'-(3,6-di-tert-butyl-9H-carbazol-9-yl)-3,5-difluoro-2'-hydroxy-5'-(2,4,4-trimethyl-pentan-2-yl)-[1,1'-biphenyl]-2-yl)oxy)ethoxy)-5'-fluoro-3'-methyl-5-(2,4,4-trimethylpentan-2-yl)-[1,1'-biphenyl]-2-ol.

Formula VII represents a coordination-insertion catalyst of the formula $(L)HfMe_2$ where (L)=2',2'''-(ethane-1,2-diyl-bis(oxy))bis(3-(3,6-di-tert-butyl-9H-carbazol-9-yl)-3',5'-difluoro-5-(2,4,4-trimethylpentan-2-yl)-[1,1'-biphenyl]-2-ol).

Formula VIII represents a coordination-insertion catalyst of the formula $(L)ZrMe_2$ where (L)=2',2'''-(ethane-1,2-diyl-bis(oxy))bis(3-(3,6-di-tert-butyl-9H-carbazol-9-yl)-3',5'-difluoro-5-(2,4,4-trimethylpentan-2-yl)-[1,1'-biphenyl]-2-ol).

Formula IX represents a coordination-insertion catalyst of the formula $(L)ZrMe_2$ where (L)=6',6'''-(ethane-1,2-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol).

Formula X represents a coordination-insertion catalyst of the formula $(L)HfMe_2$ where (L)=6',6'''-(ethane-1,2-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol).

The present invention offers a variety of thermal greases that are commonly based upon a hyperbranched olefinic fluid. These olefinic fluids are combined with a thermally-conductive filler to form a thermal grease that offers a number of advantages over conventionally available thermal greases. It is especially desirable that the thermal grease compositions of the invention offer lower cost and equal or better thermal conductivity and thermal resistance when compared to other thermal greases.

The first required component, denominated Component A, is a selected hyperbranched olefinic fluid. This fluid is desirably defined as a relatively low molecular weight, ethylene-based or ethylene-propylene-based hyperbranched olefinic fluid. In particular embodiments this hyperbranched olefinic fluid has a fire point of at least 200° C., a pour point that is 0° C. or lower, and a kinematic viscosity at 40° C., measured according to the protocol of ASTM D455, that enables use as a grease, i.e., that is desirably less than or equal to 200 centistokes (cSt, 0.0002 meter squared per second, $m^2$/sec), more preferably less than or equal to 150 cSt (0.00015 $m^2$/sec), but also desirably at least 10 cSt (0.00001 $m^2$/sec). In particular embodiments it is preferred that the number average molecular weight (Mn) range from 350 Daltons (Da) to 2,800 Da, i.e., an average of from 25 to 200 carbons per molecule; more preferably from 350 Da to 2000 Da; still more preferably from 350 Da to 1,000 Da; and most preferably from 350 Da to 700 Da.

In some embodiment Component A may further comprise additional, optional constituents such as mineral oils, synthetic oils including but not limited to silicone oils, vegetable oils, combinations thereof, and the like. Such may be selected according to desired final properties.

The second required component of the inventive thermal greases is denominated herein Component B. Component B is at least one thermally conductive filler. Appropriate selections for this may include ceramic fillers, such as, but not limited to, beryllium oxide, aluminum nitride, boron nitride, aluminum oxide, zinc oxide, magnesium oxide, silicon carbide, silicon nitride, silicon dioxide, and zinc sulfide; solid metal particles, including but not limited to silver, copper or aluminum; carbon materials, including but not limited to diamond powder; short carbon fibers, carbon black, graphite, carbon nanotubes, graphene and graphene oxide; liquid metals, such as gallium-based alloys; or combinations thereof.

Alternatively or in addition, it may be in some embodiments desirable to blend the hyperbranched olefinic fluid with, as an optional Component C, a silicone fluid, to form an immiscible viscous fluid/grease. Such Component C, termed herein a "phase segregator," may be desirable where the hyperbranched olefinic fluid has a surface tension that is different from that desired. This blending may help to reduce separation of the hyperbranched olefinic fluid from the thermally conductive filler, or other fillers, and consequent dry out. This may also enable segregation of the often high cost thermally conductive filler in one phase and the lower cost other fillers in a separate phase. Because percolation of thermal conduction can still be ensured in this manner, the result can be higher thermal conductivity at lower filler content and, therefore, lower overall cost. Examples thereof may include, but are not limited to, polydimethylsiloxane (PDMS); phenylmethyl polysiloxane; hydroxy-terminated PDMS; polydimethyl-diphenylsiloxane; polydiphenyl siloxane; and other methylalkyl polysiloxanes containing an alkyl group, such as naphthyl group, ethyl group, propyl group, or amyl group; and combinations thereof. Such may be included instead of, or in combination with, one or more of the thermally conductive fillers.

Finally, additional additives may optionally be included in the thermal grease, as another optional Component C, in order to ensure desirable properties. For example, a low cost (non-thermally conductive) filler such as silica may be included in order to ensure a desired viscosity. Flame retardants, such as aluminum trihydrate, zinc borate, a flame retardant/plasticizer such as PHOSFLEX™ 71B, available from SUPRESTA U.S. LLC™, and some other organic flame retardants may also be included. Surfactants may be included to improve dispersion of the thermally conductive filler, silicone fluid, or other additives. Such may be selected from, for example, SPAN™ serial and TWEEN™ serial, available from SINOPHARM CHEMICAL REAGENT™. Antioxidants, such as IRGAFOS™ 168 or IRGANOX™ 1010, available from THE BASF CHEMICAL COM- PANY™, may be used. Coupling agents, which may be silane based or titanate based, may be employed to treat fillers prior to incorporation in the thermal grease. Other agents, such as bleed inhibiting agents, rheology modifiers, and the like, and any combinations of the above, may also be selected for use. The proportions of the components may vary within the skill of those in the art, according to the desirable properties of the final thermal grease. However, in some embodiments it may be desirable to employ a proportion of Component A (in total) ranging from 10 volume percent (vol %) to 40 vol %, more preferably from 20 vol % to 30 vol %. Where both ethylene and propylene are used to form Component A, it is preferred that the proportion of ethylene to propylene range from 20 mole percent (mol %) to 80 mol %, and more preferred that it range from 40 mol % to 60 mol %. If another, optional alpha-olefin is included, it is preferred that the proportion thereof range from 20 mol % to 50 mol %.

Component B may preferably range from 60 vol % to 90 vol %, and more preferably from 70 vol % to 80 vol %, based on Component A and Component B combined. Regardless of proportion, the filler constitutes the dispersed phase, while Component A constitutes the matrix, or continuous, phase.

Where a surfactant is included to ensure acceptable dispersion of fillers, it is desirable in some embodiments that such surfactant ranges from 0.5 weight percent (wt %) to 3.0 wt %, preferably from 1.0 to 2.0 wt %, based upon the total weight of fillers. Flame retardants, if included, may desirably range from 2 to 6 times, based upon the weight of Component A. In certain embodiments, typical flame retardants, such as aluminum trihydrate and other inorganic compounds, may also act as fillers, and may have a significantly higher density than Component A. Finally, where an immiscible viscous fluid is formed comprising both the hyperbranched olefinic fluid and a phase segregator, such as a silicone fluid, it is desirable that the hyperbranched olefinic fluid range from 20 vol % to 80 vol % and that the miscibility modifier ranges from 20 vol % to 80 vol %, both based upon Component A alone. Even where a majority of the thermal grease is comprised of silicone fluid, however, such is not, as herein defined, "silicone-based," because of the very significant effect on properties attributed to the presence of the hyperbranched olefinic fluid. In order to prepare the inventive thermal grease compositions, it is generally desirable to first dry the selected thermally conductive filler using, for example, a conventional drying oven for a period of time suitable to ensure a moisture content of preferably less than 0.5 wt %, more preferably less than 0.1 wt %, based on the weight of the thermally conductive filler. Following drying the thermally conductive filler may, in some desirable embodiments, be surface-treated using a coupling agent and/or a surfactant to improve wettability of the thermally conductive filler by the hyperbranched olefinic fluid matrix when the two are combined. During the preparation of thermal grease, sufficient mixing of filler and matrix is required to ensure acceptably homogeneous distribution and wetting of the filler in the fluid matrix. Such mixing may be suitably carried out manually, on a laboratory scale, using a spatula or similar mixing tool, but is generally done on a commercial scale via an impeller/kneader means, a centrifugal mixer (such as a mixer commercially available from HAUSCHILD™), or a BAKER-PERKIN™ mixer.

Where further additives are selected for use, such as flame retardants, low cost (non-thermally conductive) fillers, and the like, their incorporation may be carried out simultaneously with, or either prior or subsequent to, incorporation of the thermally conductive filler. Appropriate means and methods of incorporation will be well known to those skilled in the art and will depend upon a wide variety of variables too numerous to describe in detail herein. Such may include the nature and physical properties of the additive(s) and protocols of preference based upon factors such as developing rheology.

One hyperbranched, ethylene-based olefinic fluid that is suitable for use in the invention is described in detail in co-pending patent application PCT/US2014/043754, entitled "Hyperbranched Ethylene-Based Oils and Greases,", filed Jun. 24, 2014, claiming the benefit of U.S. Provisional Application Ser. No. 61/840,622, filed Jun. 28, 2013. While detailed descriptions of some suitable embodiments are included therein, and incorporated herein by reference in their entireties, preparation thereof includes, generally, reaction of the starting monomer(s) to form a mixture of oligomers therefrom. As the term is used herein, "oligomers" are molecules, formed by consecutive addition of monomer or comonomer units, which have an average molecular size of no more than 50 units. The average size is calculated as the total number of incorporated comonomer units divided by the total number of oligomer molecules. Alternatively, another indication of molecular size is the average number of carbons per molecule, which is the total carbon count divided by the total number of molecules.

The starting monomer may be ethylene alone, or ethylene and propylene, either of which may optionally further include a proportion of another alpha-olefin comonomer. If an alpha-olefin is to be included, it may be selected from, in non-limiting example, linear alpha-olefins having from 3 to 12 carbons, such as propylene, 1-butene, 1-pentene, 1-hexene, 1-heptene, 1-octene, 1-nonene, 1-decene, undecene, 1-dodecene, and combinations thereof. Smaller linear alpha-olefins having from 3 to 8 carbons are preferred, because they allow for a higher branch density of the final product oligomers. Branched alpha-olefins may also be employed in the process feed, and may include in non-limiting embodiments singly and multiply branched alpha-olefin monomers having from 5 to 16 carbons, wherein the first substituted carbon is at the "3" or greater position with respect to the vinyl, and combinations thereof. It is generally preferred that the first substitution be at the "4" or greater position.

It is noted that the ethylene/alpha-olefin reactivity ratio is distinct for any catalyst and is expected to vary with reaction temperature. For any given catalyst the ethylene-olefin reactivity ratio ($r_1$) is determined by performing a co-oligomerization at low conversion and observing the oligomer composition (F) resulting from a chosen monomer composition (f). Equation 1 hereinbelow is the relation between F, f, and $r_1$ which can be used to estimate $r_1$ from a single oligomerization or obtain a more statistically reliable value for $r_1$ from a series of oligomerizations:

$$(1-F_2)/F_2 = r_1(1-f_2)/f_2 \quad \text{(Equation 1)}$$

FTIR or $^{13}$C NMR measurements of oligomer composition (F) are typically used for reactivity ratio determination, with $^{13}$C NMR being preferred. Alpha olefin monomer fractions ($f_2$) ranging from 33-66% are generally used for reactivity ratio determination, with a value of 50% being preferred. The preferred method for determining ethylene-olefin reactivity ratio involves an equimolar level of olefin and ethylene dissolved in a compatible solvent, such as an alkane, such that $f_1=f_2=½$. After a co-oligomerization of this mixture to a low conversion (<20%), the resulting oligomer compositions (F) are used in equation 1 to determine the reactivity ratio $r_1$.

Regardless of whether an alpha-olefin is employed, however, the catalyst selected prepare the fluid used in forming the thermal grease has an ethylene/octene reactivity ratio that is up to 20, preferably from 1 to 20, more preferably from 1 to 12, and most preferably from 1 to 6. It is noted that, while ethylene/alpha-olefin reactivity ratios will, in general, normally vary according to processing temperature, the maximum ratios set herein applies for any and all processing temperatures. Determining the reactivity based on ethylene/octene reactivity ratio may be applied regardless of whether 1-octene is included as an optional alpha-olefin in the inventive compositions, but in general smaller molecules, such as propylene, will incorporate more easily than larger molecules, such as 1-octene, and hence the ethylene/alpha-olefin reactivity ratio with, e.g., propylene, will tend to be lower. Regardless of selected co-monomer(s), determining the reactivity ratio will be required to attain a targeted oligomer composition. A simple random copolymerization model relates the mole fraction of alpha-olefin monomer ($f_2$) to the mole fraction of alpha-olefin in the copolymer ($F_2$), where $r_1$ is the ratio of ethylene reactivity to alpha-olefin reactivity, based on Equation 1 hereinabove, wherein $r_1$=ethylene reactivity/alpha-olefin reactivity; $F_2$=mole fraction alpha-olefin in the product oligomer; and $f_2$=mole fraction alpha-olefin monomer. Thus, for a given catalyst and with minimal experimentation, those skilled in the art will be able to easily determine the alpha-olefin monomer fraction ($f_2$) necessary to attain the desired alpha-olefin polymer content ($F_2$). Such desired alpha-olefin comonomer content is generally preferred to be from 30 mol % to 70 mol %, more preferably from 40 mol % to 60 mol %, particularly but not limited to the case of propylene, with the remainder desirably being the ethylene.

In preparing a suitable starting hyperbranched olefinic fluid, the selected starting monomer, or monomers, is/are contacted with a suitable coordination-insertion catalyst. As the term is used here, "coordination-insertion" means that the catalysts are capable of consecutively inserting unsaturated monomers, with the result that previously unsaturated carbons in the monomers and the oligomer become the backbone of a new oligomer. This catalyst may be selected, in one embodiment, from a wide variety of metal-ligand complexes. Those skilled in the art will be aware that catalyst performance varies with process temperature and also may vary with reaction mixture composition and conversion. Preferred catalysts are those exhibiting an activity level of 100,000 grams of oligomer per gram of catalyst metal (g/g cat). Also preferred are catalysts capable of producing a chain termination rate that results in product oligomer of a desired molecular weight.

Examples of suitable coordination-insertion catalysts may generally include, in certain non-limiting embodiments, metal-ligand complexes including any of the metals zirconium, hafnium, or titanium, and preferably zirconium or hafnium. Among these catalysts may be certain metallocene catalysts, including certain constrained geometry catalysts, and bis-phenylphenoxy catalysts, provided that the selected catalyst meets the ethylene/octene reactivity ratio and kinetic chain length requirements as defined hereinabove.

The metallocene compounds useful herein are cyclopentadienyl derivatives of titanium, zirconium and hafnium. These metallocenes (e.g., titanocene, zirconocenes and hafnocenes) may be represented by one of the following formulas:

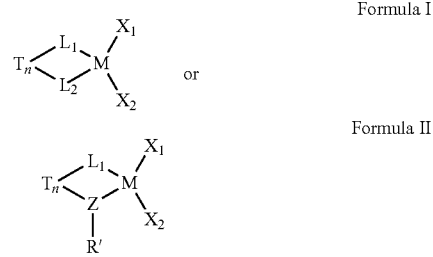

Formula I

Formula II wherein M is the metal center, and is a Group 4 metal, preferably titanium, zirconium or hafnium;

T is an optional bridging group which, if present, in preferred embodiments is selected from dialkylsilyl, diarylsilyl, dialkylmethyl, ethylenyl (—CH$_2$—CH$_2$—) or hydrocarbylethylenyl wherein one, two, three or four of the hydrogen atoms in ethylenyl are substituted by hydrocarbyl, where hydrocarbyl can be independently $C_1$ to $C_{16}$ alkyl or phenyl, tolyl, xylyl and the like, and when T is present, the catalyst represented can be in a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl, the rings of which are optionally substituted with one or more R groups, with any two adjacent R groups being joined to form a substituted or unsubstituted, saturated, partially unsaturated, or aromatic cyclic or polycyclic substituent;

Z is nitrogen, oxygen or phosphorus;

R' is a cyclic linear or branched $C_1$ to $C_{40}$ alkyl or substituted alkyl group; and $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together form an olefin, diolefin or aryne ligand.

Among the metallocene compounds which can be used in this invention are stereorigid, chiral or asymmetric, bridged or non-bridged, or so-called "constrained geometry" metallocenes. See, for purpose of non-limiting example only and for further discussion and elucidation of methods for catalyst preparation, U.S. Pat. No. 4,892,851; U.S. Pat. No. 5,017,714; U.S. Pat. No. 5,132,281; U.S. Pat. No. 5,155,080; U.S. Pat. No. 5,296,434; U.S. Pat. No. 5,278,264; U.S. Pat. No. 5,318,935; U.S. Pat. No. 5,969,070; U.S. Pat. No. 6,376,409; U.S. Pat. No. 6,380,120; U.S. Pat. No. 6,376,412; WO-A-(PCT/US92/10066); WO 99/07788; WO-A-93/19103; WO 01/48034; EP-A2-0 577 581; EP-A1-0 578 838; WO 99/29743, and also the academic literature, e.g., "The Influence of Aromatic Substituents on the Polymerization Behavior of Bridged Zirconocene Catalysts," Spaleck, W., et al., *Organometallics*, 1994, Vol. 13, pp. 954-963; "ansa-Zirconocene Polymerization Catalysts with Annelated Ring Ligands—Effects on Catalytic Activity and Polymer Chain Lengths," Brintzinger, H., et al., *Organometallics* 1994, Vol. 13, pp. 964-970; "Constrained Geometry Complexes—Synthesis and Applications," Braunschweig, H., et al., *Coordination Chemistry Reviews*, 2006, 250, 2691-2720; and documents referred to therein, all of which are incorporated herein by reference in their entireties.

In certain particular embodiments, the selected catalyst may be a compound of Formula III:

Formula III

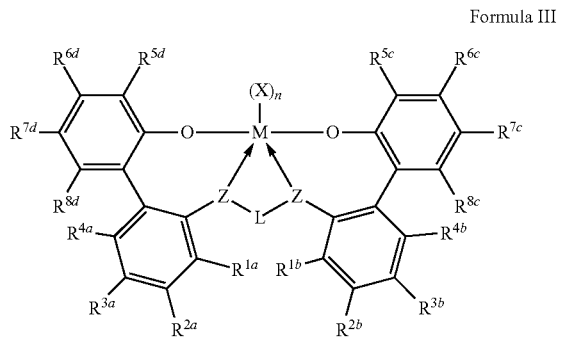

wherein M is titanium, zirconium, or hafnium, each independently being in a formal oxidation state of +2, +3, or +4; n is an integer of from 0 to 3, wherein when n is 0, X is absent; each X independently is a monodentate ligand that is neutral, monoanionic, or dianionic, or two X are taken together to form a bidentate ligand that is neutral, monoanionic, or dianionic; X and n are selected such that the metal-ligand complex of Formula (III) is, overall, neutral; each Z is independently O, S, N($C_1$-$C_{40}$)hydrocarbyl, or P($C_1$-$C_{40}$)hydrocarbyl; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 2-carbon atom to 5-atom linker backbone linking the Z atoms in Formula (III) and the ($C_1$-$C_{40}$)heterohydrocarbylene has a portion that comprises a 2-atom to 5-atom linker backbone linking the Z atoms in Formula (III), wherein each atom of the 2-atom to 5-atom linker of the ($C_1$-$C_{40}$)heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_{19}$)alkylene, each $R^P$ is unsubstituted ($C_1$-$C_{18}$)hydrocarbyl; and each $R^N$ is unsubstituted ($C_1$-$C_{18}$)hydrocarbyl, a hydrogen atom or absent; $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, O$R^C$, S$R^C$, Si($R^C$)$_3$, Ge($R^C$)$_3$, CN, CF$_3$, F$_3$CO, or halogen atom, and each of the others of $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, O$R^C$, S$R^C$, Si($R^C$)$_3$, CN, CF$_3$, F$_3$CO or halogen atom; each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom, ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, RCS(O)—, RCS(O)$_2$—, (RC)$_2$C=N—, RCC(O)O—, RCOC(O)—, RCC(O)N(R)—, (RC)$_2$NC(O)— or halogen atom; each of $R^{5c}$ and $R^{5d}$ is independently a ($C_6$-$C_{40}$)aryl or ($C_1$-$C_{40}$)heteroaryl; and each of the aforementioned aryl, heteroaryl, hydrocarbyl, heterohydrocarbyl, hydrocarbylene, and heterohydrocarbylene groups is independently unsubstituted or substituted with 1 to 5 more substituents $R^S$; and each $R^S$ is independently a halogen atom, polyfluoro substitution, perfluoro substitution, unsubstituted ($C_1$-$C_{18}$) alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl.

In more particular embodiments, the catalyst may be selected from the compounds represented by Formulas IV to X.

Formula IV

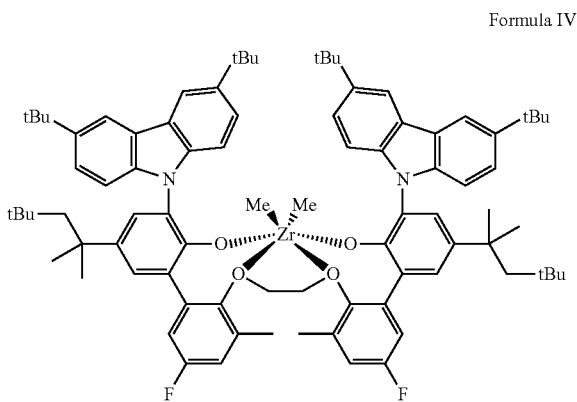

Formula V

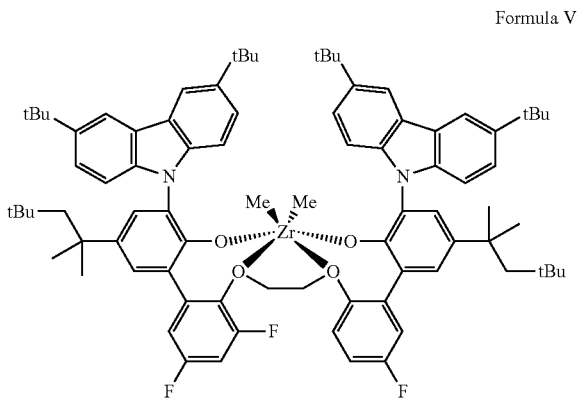

Formula VI

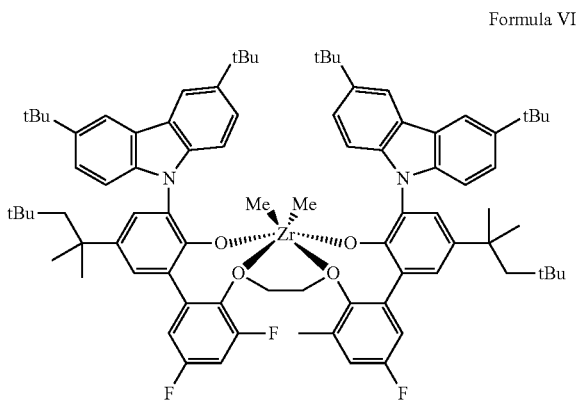

-continued

Formula VII

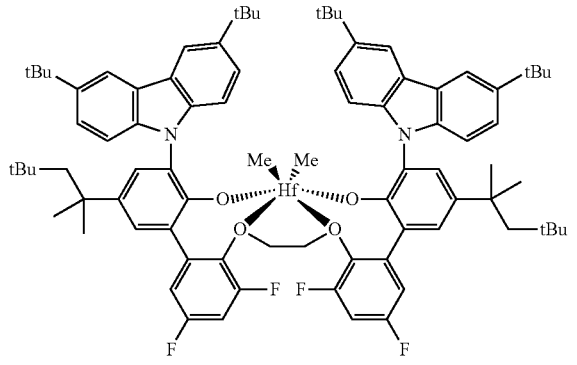

Formula VIII

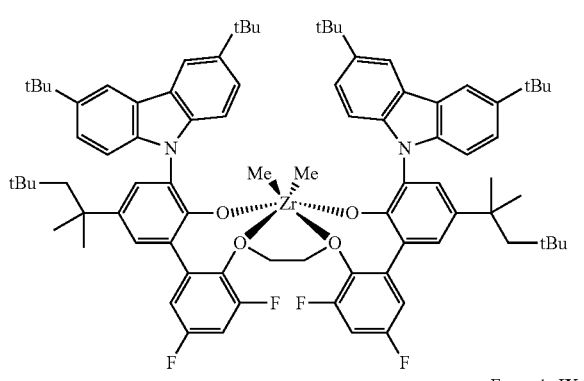

Formula IX

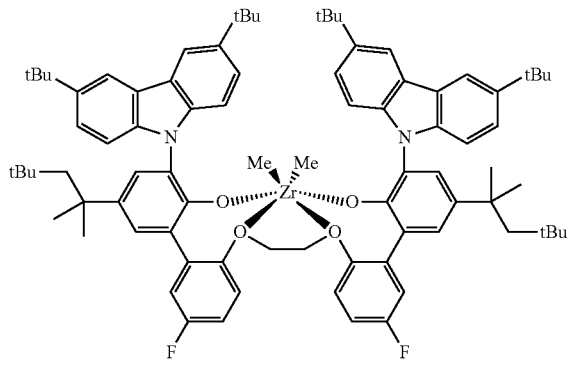

Formula X

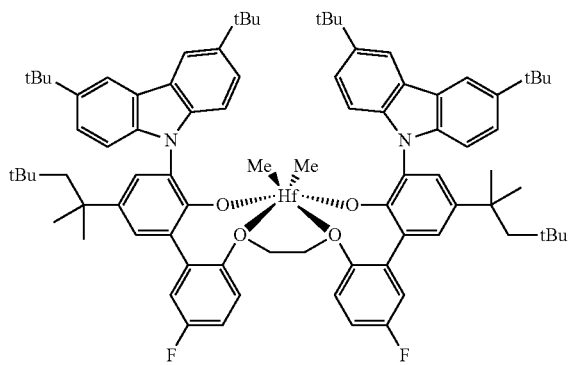

Preparation of these bis-phenylphenoxy compounds may be by any means known to or envisioned by those skilled in the art, but in general involve means and methods such as are disclosed in, for example, U.S. Serial Number PCT/US2012/0667700, filed Nov. 28, 2012, claiming priority to U.S. Provisional Application 61/581,418, filed Dec. 29, 2011, and U.S. Ser. No. 13/105,018, filed May 11, 2011, Publication Number 20110282018, claiming priority to U.S. Provisional Application 61/487,627, filed Mar. 25, 2011. Those skilled in the art will recognize that similar and analogous processes may be used to prepare other useful bis-phenylphenoxy compounds falling within the given definition.

In carrying out the process to prepare the starting hyperbranched, ethylene-based or ethylene- and propylene-based olefinic oil, it is desirable that the contact between the monomer(s) and the coordination-insertion catalyst occur in a continuously-fed backmixed reactor zone. As the term is used herein, "backmixed reactor zone" refers to an environment in which a reaction product is intermingled with unconverted reactor feeds. A continuous stirred tank reactor is preferred for this purpose, while it is noted that plug-flow reactors are specifically designed to prevent back-mixing. However, a loop reactor can accomplish a variable degree of backmixing by recycling a portion of reactor effluent to the feed of a plug-flow zone, with the recycle ratio moderating the degree of backmixing. Thus, plug-flow reactors are non-preferred, while a loop reactor with a plug flow zone is preferred. In the inventive process backmixing ensures reaction of already-produced oligomers with new feedstock, e.g., ethylene. It is this continuous contact that enables the oligomers to become branched via repeated olefin insertion, although in general use of propylene as a co-monomer alpha-olefin typically requires less backmixing to accomplish equivalent branching, because the level of branching may be controlled by the concentration of propylene within the reactor.

Conditions under which the contact occurs in the continuously-fed, backmixed reactor zone may include a temperature desirably ranging from 0° C. to 250° C., more desirably from 25° C. to 200° C., and most desirably from 50° C. to 180° C.; an ethylene partial pressure desirably ranging from 15 pounds per square inch, psi, 103 kilopascals, kPa) to 500 psi (3450 kPa), more desirably from 30 psi (207 kPa) to 300 psi (2070 kPa), and most desirably from 50 psi (345 kPa) to 200 psi (1380 kPa); and a residence time desirably ranging from 1 minute (min) to 120 min, more desirably from 5 min to 60 min, and most desirably from 10 min to 30 min. A reactor system may be comprised of many low residence time reaction zones or a few high residence time reaction zones. Nonetheless, those skilled in the art will easily understand that alteration of parameters may be employed for reasons of convenience, alteration of yield, avoidance of undesirable side products or degradation, and the like.

The result of the process is production of at least two products, denominated a hyperbranched product and an organic volatile product. The term "hyperbranched oligomer" refers to the desired or target "hyperbranched" fluid, regardless of its order of production or relative proportion. Such materials are collectively termed herein as "utility fluids." By "hyperbranched" is meant that the oligomer molecules comprise a random distribution of linear chain segments joined together through methine carbons and having an average of at least 1.5 methine carbons per molecule. Hyperbranching is present when the methine carbons are randomly located in the molecule and are not isolated to the main polymer backbone such as with a standard ethyleneolefin copolymer. $^{13}$C NMR measurement of methine carbons may be used to determine the overall branching level. It is noted that, because of the nature of coordination-insertion, continued contact of feedstock and backmixed product with the catalyst would be expected to eventually result in true, completed polymerization, or an excessive level of branching, thereby forming a material that may contain a predominant amount of a hyperbranched product. Thus, the conditions of reaction, notably time, temperature and pressure, are desirably controlled so as to produce the desired hyperbranched oligomer. The final hyperbranched oligomer may be further characterized in that at least 40 percent of the methine carbons is derived from the ethylene; and the average number of carbons per molecule is from 25 to 200, i.e., the molecular weight is the desired oligomer fraction is preferably from 350 to 2800. In particular embodiments, the "hyperbranched" product has at least 55 methine carbons per one-thousand total carbons, and in more preferred embodiments, it has at least 70 methine carbons per one-thousand total carbons. This branching level is affected by both the incorporation of added alpha-olefins and the incorporation of in situ generated olefins. This fraction may be conveniently denominated as the "heavies" product.

Additional desired characteristics of the hyperbranched fluid produced include embodiments wherein it is an oligomer grease having a pour point of less than 0° C., and embodiments wherein the oligomer grease has a pour point of less than −20° C., or less than −25° C., or less than −35° C., or less than −40° C.

The organic volatile product comprises one or more so-called "light" oligomers, i.e., oligomers that are C14 and below, which are removable via devolatilization such that no more than 10 wt %, preferably no more than 5 wt %, remain with the hyperbranched product.

Because the inventive thermal grease utilizes the hyperbranched fluid per se, it is desirable to devolatilize the product mixture to separate the hyperbranched and organic volatile product from one another, and thereby to recover the hyperbranched fluid. This devolatilization may be carried out using any conventional devolatilization means and methods, including, in non-limiting embodiments, use of extruder reactors and/or kneader reactors, and methods including, for example, direct separation, main evaporation bulk evaporation, steam stripping, and/or direct devolatilization. In general, harsher devolatilization conditions will remove a greater proportion of the organic volatile product, which in general will tend to increase the fire point and lower the pour point of the hyperbranched olefinic fluid. For purposes of the invention, the hyperbranched fluid is, in preferred embodiments, thereafter hydrogenated, in order to increase the oxidative stability of the product and lower the pour point.

It is important to note that the mechanism occurring in preparing the hyperbranched fluids useful in the present invention is coordination-insertion, where monomers add to a growing molecule through an organometallic center such that a molecular backbone is formed from carbons that originated from unsaturated carbons in the monomer units. Thus, an ethylene-only coordination-insertion oligomerization will produce branches with almost exclusively even numbers of carbons, and a coordination-insertion co-oligomerization involving ethylene and an olefin with an odd number of carbons (N) will result in branches with an odd number of carbons (N-2). This is distinct from "chain walking," which produces branches with a random distribution of both odd and even numbers of carbons. Thus, those skilled in the art will understand without further direction how to distinguish these via $^{13}$C NMR.

It is further suggested herein that the relatively high weight percent of product having methine branch carbons resulting from the coordination-insertion mechanism serves to ensure that a majority of the molecules are morphologically smaller and yet have the same molecular weight, which results in reduction in viscosity. As is well-known to those skilled in the art, the $^{13}$C NMR spectra may be analyzed to determine the following quantities:

Number of methine carbons per one-thousand total carbons

Number of methyl carbons per one-thousand total carbons

Number of vinyl groups per one-thousand total carbons

Number of vinylidene groups per one-thousand total carbons

Number of vinylene groups per one-thousand total carbons

Based on the results obtained in the analysis of the $^{13}$C NMR spectra, the average number of carbons per molecule (Cn) may be determined using the following equation, which is based on the observation that every additional methine carbon, vinylidene group, and vinylene group results in an additional methyl carbon chain end:

$$1000/Cn = \text{methyl carbons} - \text{methine carbons} - \text{vinylidene groups} - \text{vinylene groups} \quad \text{(Equation 2)}$$

Alternatively, the average number of carbons per molecule (Cn) may be determined for cases wherein each oligomer molecule has a single unsaturation which occurs upon chain termination. Exclusive terminal unsaturation is common when oligomerizations and polymerizations occur without the presence of added chain transfer agents, such as hydrogen or metal alkyls.

$$1000/Cn = \text{vinyl group} + \text{vinylidene group} + \text{vinylene group} \quad \text{(Equation 3)}$$

An alternate determination of the average number of carbons per molecule (Cn) may be accomplished by simply averaging the two previous methods. The advantage of this method is that it no longer uses the vinylidene and vinylene group levels and gives the correct Cn even when no vinyls are present.

$$1000/Cn = (\text{methyl carbons} - \text{methine carbons} + \text{vinyl group})/2 \quad \text{(Equation 4)}$$

Determination of the average level of branching, in terms of number of branches per one-thousand (1,000) carbon atoms (Bc), is equal to the methine carbon count per one-thousand total carbons.

$$Bc = \text{methine carbons} \quad \text{(Equation 5)}$$

The number average degree of branching, in terms of number of branches per oligomer molecule (Bn), may be determined by multiplying Bc and Cn and resolving the one-thousand carbon basis.

$$Bn = Bc \cdot Cn/1000 \quad \text{(Equation 6)}$$

Determination of the mole fraction of oligomers having a vinyl group (Fv) is made as follows:

$$Fv = (\text{vinyl group}) \cdot Cn/1000 \quad \text{(Equation 7)}$$

For the case where every molecule has a single unsaturation, Fv becomes:

$$Fv = (\text{vinyl group})/(\text{vinyl group} + \text{vinylidene group} + \text{vinylene group}) \quad \text{(Equation 8)}$$

To determine the mole fraction of methine carbons that is derived from the ethylene feed rather than derived from added alpha-olefin monomer, mass balance calculations may be carried out. Those skilled in the art will be able to easily do this in the appropriate context with process variables taken into account. However, for some cases of added alpha-olefin monomer, it is alternatively possible to measure or conservatively estimate this quantity. (For larger proportions of propylene, it may be more convenient to employ equation 4 hereinabove.) For example:

(a) Added propylene monomer will result in methyl branches when incorporated into the oligomer backbone. A skilled practitioner can use $^{13}$C NMR spectral data to calculate the methyl branch level per one-thousand carbons. Each methyl branch is expected to be accompanied by a methine carbon that is not derived from ethylene and/or from propylene. Therefore, calculation of the fraction of methine carbons derived from ethylene and/or from propylene is given below:

(b) Fraction of methines derived from ethylene=(methine carbons–methyl branches)/(methine carbons) (Equation 9)

(c) Added hexene monomer will result in n-butyl branches when incorporated into the oligomer backbone. A skilled practitioner can use $^{13}$C NMR spectral data to calculate the n-butyl branch level per one-thousand carbons. However, some n-butyl branches are expected to occur in the absence of added hexene both as chain ends and ethylene-derived branches. Nonetheless, attribution of all n-butyl branches to added hexene incorporation results is a conservative estimate of methine carbons derived from ethylene as follows:

Fraction of methines derived from ethylene=(methine carbons–$n$-butyl branches)/(methine carbons) (Equation 10)

The most definitive determination of methine fraction derived from ethylene is done using mass balance data around the oligomerization process. The mass balance data will indicate the net molar consumption of added monomer which can be a cumulative value for a semi-batch process or a rate value for a fully continuous process. The mass balance will also indicate the total moles of carbons as oligomers, which can be a cumulative value for a semi-batch process or a rate value for a fully continuous process.

Net added monomer per one-thousand carbons=1000*(net added monomer moles)/(total moles of carbons as oligomers) (Equation 11)

The fraction of methines derived from ethylene is then calculated in the same manner as the methods that use only $^{13}$C NMR data:

Fraction of methines derived from ethylene=(methine carbons–net added monomer per one-thousand carbons)/(methine carbons) (Equation 12)

Number average molecular weight (Mn) of the hyperbranched oligomer produced by the inventive process desirably ranges from 350 Da to 2800 Da, more desirably from 350 Da to 1000 Da, and most desirably from 350 Da to 700 Da. This may be determined using standard methods known to those skilled in the art, including gel permeation chromatography and gas chromatography. Furthermore, determination of Mn of oligomers using $^{13}$C NMR techniques is possible, taking into account the fact that Mn is about 14 times the average number of carbons per molecule (Cn). The exact method used to relate $^{13}$C NMR data to Mn is affected by monomer choice such as the feeding of branched and/or multiply unsaturated monomers. Nonetheless, those skilled in the art will easily comprehend how recipe changes may require amendment of this $^{13}$C NMR method to measure Mn.

Viscosity measurements may be carried out on, for example, a BROOKFIELD™ CAP 2000+ viscometer with a 01 spindle. Approximately 70 microliters (μL) of the sample are added via a micropipette to the center of the plate which is held at 25° C. The spindle is dropped onto the sample and spun at 1000 revolutions per minute (rpm) for 40 seconds until the viscosity measurement stabilizes. The instrument is calibrated to a Cannon Instruments viscosity standard of 203 centipoise (cP, 0.203 pascal*second, Pa*s) at 25° C. For high viscosity samples, the spin rate is reduced to 300 rpm or until the percent torque drops to between 50% and 75%.

Flash point measurements may be carried out on, for example, an ERAFLASH™ instrument from ERA ANALYTICS™ with a high temperature attachment. An amount, 2 mL, of sample is added to the stainless steel sample cup via a micropipette and a stir bar is added. The sample cup and holder are placed into the sample chamber and the door is closed. Run parameters for the ERAFLASH™ include: stir rate=100 revolutions per minute (rpm), heat rate=10° C./min, with ignition every 2° C., temperature range=70° C., ignition time=2 milliseconds, air volume=10 mL between 150° C. and 300° C. After each sample the chamber is cleaned and the electrodes are cleaned with a wire brush typically provided by the manufacturer.

The described process for preparing the hyperbranched olefinic fluid results in particularly desirable rheological properties, including unexpectedly low viscosity for a given molecular weight, e.g., in some embodiments less than 60 centipoise (cP, 0.06 pascal second, Pa*s) at room temperature. As noted, the hyperbranched product may also exhibit low pour point, in some embodiments less than –25° C. and high flash point, in some embodiments greater than 200° C. In particular, the process may be relatively inexpensive to carry out, both because it can use low-cost and readily-available starting materials, and can be carried out as a continuous or semi-batch process that employs a conventional backmixed reactor. In particular, it employs one or more of the identified coordination-insertion catalysts, selected from a group of catalyst families, and the catalyst may operate efficiently and over a wide thermal operating range, in some non-limiting embodiments withstanding temperatures exceeding 200° C.

Further detail with regard to such hyperbranched oils and greases may be found in the previously-referenced co-pending patent application, PCT/US2014/043754, entitled "Hyperbranched Ethylene-Based Oils and Greases," filed Jun. 24, 2014, claiming the benefit of U.S. Provisional Application Ser. No. 61/840,622, filed Jun. 28, 2013.

In summary, the inventive thermal grease compositions, comprising one or more of the hyperbranched olefinic fluids as defined, exhibit desirable properties including viscosity and dispensing properties. As defined herein, dispensing is a subjective judgment of the workability exhibited by the thermal grease, when pasted using a spreading tool. The grease is judged herein based upon feeling the spreading resistance and observing the degree of homogeneity of its appearance of the spreading coating. As shown in the Examples section hereinbelow, in many cases the thermal conductivity of the inventive thermal grease compositions may be higher than that of thermal greases that are otherwise comparable but which contain a silicone oil matrix only. Also, the inventive thermal grease compositions may exhibit superior thermal resistance when compared to such purely silicone oil matrix greases. As previously described, such grease compositions may exhibit desirably high fire points and desirably low pour points, thus enabling their use in applications requiring a relatively wide operating temperature. They may exhibit a reduced tendency, in comparison with silicon oil-based greases, to migrate, and therefore to contaminate, their environments, therefore making them more desirable for electronics applications in particular. Moreover, the inventive thermal grease compositions are in many embodiments less costly to produce and, therefore, likely to be priced lower in the marketplace.

The following examples and comparative examples are intended to illustrate a few embodiments of the invention and are therefore not intended to limit its scope in any way.

EXAMPLE 1 AND COMPARATIVE EXAMPLE 1

Thermal grease samples are prepared, with a first series serving as inventive samples (Example 1a-1f), based on a hyperbranched olefinic fluid, and the second serving as comparative samples (Comparative Example 1a'-1f') based on a silicone oil.

A. Preparing a Hyperbranched, Ethylene-Based Olefinic Fluid

In order to prepare a suitable hyperbranched, ethylene-based olefinic fluid, feeds comprising ethylene, ISOPAR-E™ as a solvent, and toluene (as a solvent to dissolve the catalyst) are passed through columns of activated alumina and Q-5 in order to first remove water and oxygen therefrom. These feeds are then introduced into an adiabatic, continuous stirred tank reactor (CSTR), with typical CSTR backmixing, with the solvent (toluene), catalyst (Formula V), and activator (ISOPAR-E™) being introduced into the reactor via stainless steel lines from syringe pumps located in a glovebox containing an atmosphere of nitrogen. The ethylene and the catalyst solution are introduced via independent dip tubes and metered with the aid of mass flow controllers. The reaction is allowed to proceed at a temperature of 60° C., with a residence time of 10 minutes, a $C_2$ feed rate of 1.00 g/min, and a feed mass fraction of $C_2$ monomer of 0.14 ($C_2$ feed rate/total feed rate).

The vessel is heated by circulating hot silicone oil through the external jacket and cooled when required via an internal cooling coil with water. The reactor pressure is controlled with a GO REGULATOR™ BP-60 back pressure regulator. The system is run hydraulically filled with no head space and without a devolatilization unit. Polymer solutions are removed from the vessel for periodic sampling from an outlet on the reactor head fitted with an electrically heated stainless steel line. Solution olefin concentrations of the reactor effluent are then measured via a Fourier Transform Near Infrared (FT-NIR) spectrometer to determine the in-reactor concentration of ethylene. Further analyses of the product are carried out via $^{13}C$ NMR as described hereinbelow.

Once the desired reaction endpoint is reached, the hyperbranched olefinic fluid is treated, prior to collection, with a catalyst deactivator comprising 2-propanol with water and a stabilizer package containing IRGANOX™ 1010, pentaerythritol tetrakis(3,5-di-tert-butyl-4-hydroxyhydrocinnamate), and IRGAFOS™ 168, tris(2,4-di-tert-butylphenyl) phosphite from CIBA GEIGY CORPORATION™. Multiple runs are performed in the CSTR and the oligomer fractions are all combined. Oligomers are first rotary evaporated at 80° C./10 Torr to remove solvent, then passed through a wipe-film evaporator (WFE) set at 155° C./100 mTorr. The products from the WFE are collected and tested for viscosity. Among the products those designated as "lights" are generally residual solvent and light product molecules that tend to degrade the flash and fire points of the material, while the "heavies" are all other products that comprise the desirable hyperbranched ethylene-based olefinic fluid to be used in making a thermal grease. Kinematic viscosity (cSt, 40° C./100° C., according to ASTM D445) is 34.94/6.60. Samples are not hydrogenated, such as might be desirable on a commercial scale for product stability, and one olefinic unit remains for each oligomer chain.

Testing is carried out to determine flash point and pour point of the base, or matrix, hyperbranched olefinic fluid and also of a selected silicone-based matrix, as described hereinbelow. In general the physical properties such as fire point and pour point of the final thermal grease tend to be reasonably correlated to the same properties of the matrix fluid, so determination of such may be carried out on the fluid in the absence of fillers for convenience. It is also noted, however, that, while fire point is always higher than flash point, it is not always predictable how much higher it will be. However, because flash point determination generally requires a smaller sample, it is often used in lieu of fire point determination for experimental purposes.

Flash point: Measurements are made on an ERA-FLASH™ instrument from ERA ANALYTICS™ with a high temperature attachment. This method follows ASTM D93 for a closed cup flash point measurement. In this protocol 2 mL of sample are added to the stainless steel sample cup via a micropipette and a stir bar is added. The sample cup and holder are placed into the sample chamber and the door is closed. Run parameters for the ERA-FLASH™ include: stir rate=100 rpm, heat rate=10° C./min, Step=2° C. temperature range=70° C., ignition=2 milliseconds (ms), air volume=10 mL/min between 150° C. and 300° C. After each sample the chamber is cleaned and the electrodes are cleaned with a wire brush provided by the manufacturer.

Pour Point: In a 48 well plate with vials, 1 mL of sample is added to each vial, followed by one copper BB. This method follows ASTM D455. Measurements are run in triplicate and the measurement is based upon two agreements. A rubber mat is placed on top of the samples and the 48 well plate is placed into a temperature programmed freezer. After a minimum of 4 h, the samples are removed and flipped onto a scanner. The samples are allowed to stand for 1 min and then scanned, with the image being used to determine if the copper BB is apparent in the scanned image. This serves as a pass/fail test. The freezer temperature is then changed and the procedure repeated until the desired level of pour point resolution is attained.

Table 1 shows the experimental conditions that are used in synthesizing the hyperbranched, ethylene-based olefinic fluid for Example 1, for each of the runs. In this case the catalyst corresponds to Formula V.

TABLE 1

Typical experimental conditions for synthesis of the hyperbranched, ethylene-based olefinic fluid

| Run | FT-NIR C2 Conv (%) | FT-NIR C2 (g/dL) | FT-NIR Cx (g/dL) | Total feed rate (g/min) | Total catalyst metal (ppm) | Catalyst feed Rate (μmol/min*) |
|---|---|---|---|---|---|---|
| 1 | 96.2 | 0.37 | 4.2 | 7.36 | 0.56 | 0.045 |

*μmol/min = micromoles per minute

For $^{13}$C NMR confirmations, samples are dissolved in 10 millimeter (mm) NMR tubes in chloroform-d with 0.02 M chromium(III) acetyl acetonate (Cr(AcAc)$_3$, C$_{15}$H$_{21}$CrO$_6$, tris(2-4-pentanediono)-chromium(III)) added. The typical concentration is 0.50 g/2.4 mL The tubes are then heated in a heating block set at 50° C. The sample tubes are repeatedly vortexed and heated to achieve a homogeneous flowing fluid. For samples with visible wax present, tetrachloroethane-d$_2$ is used as the solvent instead of chloroform-d, and the sample preparation temperature is 90° C. $^{13}$C NMR spectra are taken on a BRUKER™ AVANCE™ 400 megahertz (MHz) spectrometer equipped with a 10 mm cryoprobe. The following acquisition parameters are used: 5 seconds relaxation delay, 90 degree pulse of 13.1 microseconds, 256 scans. The spectra are centered at 80 ppm with a spectral width of 250 ppm. All measurements are taken without sample spinning at either 50° C. (for chloroform solutions) or 90° C. (for tetrachloroethane solutions). The $^{13}$C NMR spectra are referenced to 77.3 ppm for chloroform or 74.5 ppm for tetrachloroethane. The analysis results from $^{13}$C NMR spectra are given in Table 2.

Table 3 shows a comparison of the flash point and pour point of the Example 1 hyperbranched, ethylene-based olefinic fluid and, as Comparative Example 1, a selected silicone-based fluid.

TABLE 3

Comparison of flash point and pour point of hyperbranched olefinic fluid and a silicone-based fluid

| Fluid | Flash point, ° C. (ASTM D-93) | Pour point, ° C. (ASTM D-455) |
|---|---|---|
| Hyperbranched olefinic fluid (ethylene-based) | 229.8 | −15 |
| Silicone fluid* | 293.7 | Below −50 (freezer-limited) |

*A 50/50 vol % mixture of Dow Corning 510 ™ fluid (phenylmethyl polysiloxane) having a viscosity of 100 cSt and the same fluid having a viscosity of 50 cSt.

B. Preparing the Thermal Greases

The matrix hyperbranched olefinic fluid or selected silicone oil is first weighed into a ceramic cylinder cup. Surfactant, SPAN™ 85, used only with hyperbranched fluid to overcome polarity issues that tend to reduce grease homogeneity, is weighed and added into the matrix and the mixture is stirred with a metal spatula until the surfactant is fully mixed into the matrix. Thermally conductive fillers are weighed and pre-mixed by dramatic hand shaking. Thereafter the fillers are added into the ceramic cylinder cup and are dispersed into the matrix mixture by sufficient stirring and kneading with a metal spatula until the matrix appears visually to have fully wetted the filler surface and the composite appears as a smooth and uniform blend. The

TABLE 2

$^{13}$C NMR analysis results of the hyperbranched olefinic fluid

| | Degree of Branching | | | | | Concentration of unsaturation | | | | Branches |
|---|---|---|---|---|---|---|---|---|---|---|
| | Hexyl | | | | Total Branches | | Vinyl | | % | |
| Mn | (per 1000 carbons) | Butyl | Ethyl | Methyl | (per 1000 carbons) | Vinylene | V1 | V3 | Vinylidene | Vinyls | per molecule |
| 528 | 39.0 | 22.1 | 64.9 | 0.7 | 126.5 | 4.25 | 5.57 | 11.75 | 6.54 | 61.6 | 4.78 |

Mn is number average molecular weight stirring is carried out at approximately 100 revolutions per minute (rpm) for three times, with each time being at least 10 min to ensure good visual homogeneity. The resultant thermal greases are transferred into and stored in a capped glass vials. The prepared greases have the constituencies given in Table 4.

and the duration of the test is 10 min. The value at 1.1/s is recorded and used for comparison. Testing is carried out according to the protocol of modified ASTM D4440-08.

Thermal resistance: The thermal grease samples are evaluated for thermal resistance by Apparatus LW-9389™, available from LONG WIN SCIENCE AND TECHNOL-

TABLE 4

Constituents of thermal grease compositions for Examples 1a-1f and Comparative Examples 1a'-1f'

| Component | Specification | Supplier |
|---|---|---|
| Hyperbranched olefinic fluid* | 72 cSt (25° C.)-ethylene based 650 cSt (25° C.)-ethylene and propylene based | Synthesized as described |
| Phenylmethyl polysiloxane* | 510 ™** fluid 100 cSt (50 vol %), 50 cSt (50 vol %) | Dow Corning |
| Surfactant*** | SPAN ™ 85, chemically pure reagent | Sinopharm Chemical Reagent |
| AlN | WLS**** (D50 = 9.8 μm, D100 = 136 μm) | Toyo Aluminum |
| Alumina (Al$_2$O$_3$) | AX3-75**** (D50 = 3 μm, D100 = 75 μm) AX35-125**** (D50 = 35 μm, D100 = 125 μm) AX10-32**** (D50 = 10 μm, D100 = 32 μm) | Nippon Steel |
| ZnO | Nano-ZnO**** D50 = 0.35 μm | Wuxi Zehui Chemical |
| Alumina (Al$_2$O$_3$) | ASFP-20**** (spherical alumina) | Denka |

*These are matrix materials. Only one is used for any given formulation.
**Dow Corning's 510 ™ fluid is polyphenylmethyldimethylsiloxane, which is a clear, heat stable silicone fluid.
***SPAN ™ 85 is a surfactant (sorbitane trioleate) that is used only with the hyperbranched olefinic fluid based thermal grease formulation.
****WLS, AX3-75, AX35-125, AX10-32, Nano-ZnO, and ASFT-20 are tradenames of the listed suppliers.
D50 = MMD, mass-medium-diameter, average particle diameter by mass; D100 = maximum particle diameter by mass.

Following formation of greases following incorporation of all constituents shown in Table 5, testing is done to determine thermal conductivity (TC), shear viscosity, and thermal resistance. Testing is also done on a commercially available, silicone-based thermal grease denominated as Z9™, available from DEEPCOOL™. Testing methodology is described as follows.

Thermal conductivity (TC): Thermal conductivity (W/m·K) of thermal grease samples is measured with a HOT DISK™ instrument (TPS 2500S, transient plane source), available from HOT DISK AB™, Sweden, conforming to the standard of ISO 22007-2:2008. For these grease samples, the measurement is done with a smaller HOT DISK™ sensor (3.2 millimeter, mm, radius) in a liquid cell. The experimental parameters used to collect the data are: Temperature 24° C., Power 0.2 watt (W), and Time 2 Sec.

Frequency sweep test for viscosity: Shear viscosity is measured at 25° C. on 25 mm steel parallel plates of an AR2000EX™ stress control rheometer, available from TA INSTRUMENTS™. The shear rate is set from 0.1/s to 5/s OGY CORPORATION™, conforming to ASTM D5470-06 standard. The test conditions include: Constant $T_{avg}$ (average temperature of hot interface and cold interface between sample and thermo-sensor) 60° C., Contact Pressure 20, 40, 80 psi, Die Area 6.4516 cm$^2$, Test Duration—30 min.

Table 5 shows formulations and testing results.

Example 1a to 1f and Comparative Example 1a' to 1f' shown in Table 5 illustrate differences in performance of thermal greases based upon hyperbranched ethylene-based fluids versus those based on 50/50 vol % mixture of phenylmethyl polysiloxane fluids having two different viscosities. The phenylmethyl polysiloxane mixture is selected in order to obtain a material having a viscosity comparable to that of the base hyperbranched olefinic fluid. The surfactant SPAN™ 85 is used for only Examples 1a to 1f and is intended to compensate for the higher polarity of the hyperbranched material, in order to assure comparable dispersion of the thermally conductive filler.

TABLE 5

Formulations and performance results of Examples 1a-1f and Comparative Examples 1a'-1f'.

| | | Example 1 | | | | | | Comparative Example 1 | | | | | | |
|---|---|---|---|---|---|---|---|---|---|---|---|---|---|---|
| | Volume % | a | b | c | d | e | f | a' | b' | c' | d' | e' | f' | Z9 |
| Matrix | Hyperbranched ethylene fluid, (SPAN ™ 85, wt % of fillers) | 33 (1.0) | 28.7 (1.5) | 25 (1.0) | 25.5 (1.0) | 23.9 (1.0) | 25.5 (1.0) | | | | | | | |
| | Phenylmethyl polysiloxane | | | | | | | 33 | 28.7 | 25 | 25.5 | 23.9 | 25.5 | Silicone oil-based grease |
| Filler | AlN (WLS) | 67 | 71.3 | | | | | 67 | 71.3 | | | | | |
| | Spherical Al$_2$O$_3$ AX35-125/ AX3-75 = 7/3 | | | 75 | | | | | | 75 | | | | |

TABLE 5-continued

Formulations and performance results of Examples 1a-1f and Comparative Examples 1a'-1f'.

| Volume % | Example 1 | | | | | | Comparative Example 1 | | | | | | Z9 |
|---|---|---|---|---|---|---|---|---|---|---|---|---|---|
| | a | b | c | d | e | f | a' | b' | c' | d' | e' | f' | |
| Spherical $Al_2O_3$ AX10-32 | | | | 59.7 | 60.9 | 67 | | | | 59.7 | 60.9 | 67 | |
| Spherical $Al_2O_3$ ASFP-20 | | | | | | 7.5 | | | | | | 7.5 | |
| ZnO (D50 = 0.35 μm) | | | | 14.8 | 15.2 | | | | | 14.8 | 15.2 | | |
| Viscosity (Pa · s at shear rate of 1.1/s) | 165 | 424 | 135 | 1069 | 1919 | 1461 | 265 | — | 110 | 940 | — | 1461 | 531 |
| Paste-like appearance & dispensing property | good | good | good | fair | good | good | good | N/A | good | fair | poor | good | fair |
| Thermal conductivity (W/mK) | 3.13 | 3.84 | 3.50 | 3.14 | 3.22 | 2.69 | 2.93 | — | 3.17 | 2.93 | — | 2.37 | 2.87 |

— indicates data was not obtained
N/A indicates grease could not be formed

As can be seen, inventive Example 1a has a higher thermal conductivity than Comparative Example 1a. In inventive Example 1b and Comparative Example 1b', AlN loading is increased to 71.3 vol %, which leads to different performance results. Inventive Example 1b is described as a "good" thermal grease, having relatively low viscosity and higher thermal conductivity, while Comparative Example 1b' cannot form a grease due to its much higher viscosity. This is characterized by the fact that the sample cannot be pasted at all. This is because, although the hyperbranched olefinic fluid and phenylmethyl polysiloxane base matrices have almost the same viscosity, the hyperbranched olefinic fluid system can accommodate more filler to achieve higher thermal conductivity.

It is also noteworthy that the inventive Example 1c and Comparative Example 1c' matrices have similar appearance and viscosity adaptation for a spherical $Al_2O_3$ (35 μm:3 μm=7:3) system at the given loading level of 75 vol %. However, the thermal conductivity of inventive Example 1c is slightly higher than that of Comparative Example 1c'.

In order to simulate applications having thin gaps, i.e., small bond line thickness (BLT), inventive Examples 1d to 1f and Comparative Examples 1d' to 1f' use smaller cut point size (i.e., D100). The primary thermally conductive filler for each is spherical $Al_2O_3$(D50=10 μm, D100=32 μm). A submicron filler (ZnO and spherical $Al_2O_3$) is also used in combination. As in inventive Examples 1a to 1b and Comparative Examples 1a' to 1b', it is observed that the hyperbranched olefinic fluid matrix can incorporate more filler than the phenylmethyl polysiloxane matrix, resulting in a higher thermal conductivity for the hyperbranched olefinic fluid based thermal grease. It is also noted that both Inventive Example 1d and Comparative Example 1d' exhibit good paste and tack properties, which would be helpful in practical application.

Thermal resistance results show that inventive Example 1d has a relatively low thermal resistance, of 0.028 degree Celsius-inch squared per watt (° C.-in$^2$/W) at a relatively low contact pressure load of 20 pounds per square inch (psi, approximately 137.9 kilopascals, kPa). Thus, low mounting pressure is allowed for the use of such grease. For comparison, the product datasheet for Z9™ product, available from DEEPCOOL™ states that the silicone oil based commercial product has a thermal resistance of less than or equal to 0.058° C.-in$^2$/W, which would be defined as an inferior performance result.

EXAMPLE 2 AND COMPARATIVE EXAMPLE 2

Two sets of thermal greases are prepared, the first including a hyperbranched, ethylene- and propylene-based olefinic fluid as the matrix Component A, and the second including only a silicone fluid, phenylmethyl polysiloxane, as the matrix Component A.

A. Preparation of the hyperbranched, ethylene- and propylene-based olefinic fluid is conducted in a 2 L Parr™ batch reactor on a semi-batch basis. The reactor is heated by an electrical heating mantle, and is cooled by an internal serpentine cooling coil containing cooling water. Both the reactor and the heating/cooling system are controlled and monitored by a CAMILE™ TG process computer. The bottom of the reactor is fitted with a dump valve, which empties the reactor contents into a stainless steel (SS) dump pot, which is prefilled with a catalyst kill solution (typically 5 mL of a IRGAFOX™/IRGANOX™/toluene mixture). The dump pot is vented to a 30 gallon blowdown tank, with both the pot and the tank $N_2$ purged. All chemicals used for polymerization or catalyst makeup are run through purification columns to remove any impurities that may affect polymerization. The propylene is passed through 2 columns, the first containing $Al_2O_4$ alumina, the second containing Q5 reactant to remove oxygen. The ethylene is also passed through 2 columns, the first containing $Al_2O_4$ alumina, and 4 Angstroms (Å) pore size molecular sieves, the second containing Q5 reactant. The $N_2$, used for transfers, is passed through a single column containing $Al_2O_4$ alumina, 4 Å pore size molecular sieves and Q5 reactant.

The reactor is loaded first with toluene and then with propylene to the desired reactor load. After liquid feed addition, the reactor is heated up to the polymerization temperature set point. Where ethylene is used, it is added to the reactor when at reaction temperature to maintain reaction pressure set point. Ethylene addition amounts are monitored by a micro-motion flow meter.

The catalyst and activators are mixed with the appropriate amount of purified toluene to achieve a desired molarity solution. The catalyst and activators are handled in an inert glove box, drawn into a syringe and pressure transferred into the catalyst shot tank. This is followed by 3 rinses of toluene, 5 mL each.

Immediately after catalyst addition the run timer begins. Where ethylene is used, it is then added by the CAMILE™ to maintain reaction pressure set point in the reactor. These polymerizations are run for the desired amount of time, then the agitator is stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the oligomers are weighed for yield/efficiencies, and submitted for testing.

TABLE 6

Reactor Parameters

| Temp °C. | Toluene g | Batch Ethylene g | Ethylene Pressure psi) | Batch Propylene g | Ethylene g initial | Ethylene g added | Run time min | Catalyst Formula | Catalyst µmoles | Catalyst metal | RIBS-2* µmoles | MMAO-3A** µmoles | Exotherm °C. |
|---|---|---|---|---|---|---|---|---|---|---|---|---|---|
| 120 | 300 | 17.1 | 359.7 | 140.5 | 17.1 | 10.1 | 3.8 | X | 2.5 | Hf | 3 | 10 | 1.9 |

*RIBS-2 co-catalyst: (CAS); Amines, bis(hydrogenated tallow alkyl)methyl, tetrakis(pentafluorophenyl)borate(1−)
**MMAO-3A co-catalyst is a modified methyl aluminoxane

TABLE 7

Characterizing data of the hyperbranched olefinic fluid

| Unsaturation | | | | | | Viscosity | |
|---|---|---|---|---|---|---|---|
| % Vinyls | % Vinylidenes | % Vinylenes | Branches per 1000 C's | Mol % C3 | Mn ($^1$H NMR) | @ 40° C. (cSt) | @ 100° C. (cSt) |
| 31 | 68 | 1 | 195.04 | 48.6 | 708.05 | 109.5 | 16.0 |

This is carried out as in Example 1, with the parameters shown in Table 6, except that the co-monomer propylene is included as a feed, with a $C_3$ feed rate of 1.00 g/min, and a feed mass fraction of $C_3$ monomer of 0.14 ($C_3$ feed rate/total feed rate). The resulting hyperbranched olefinic fluid exhibits the characteristics shown in Table 7. The catalyst corresponds to Formula X.

Following preparation of the hyperbranched ethylene- and propylene-based olefinic fluid and selection of the silicone-based matrix for the Comparative Example 2 grease, the matrix fluids are tested to determine flash points and pour points, using the procedures described in Example 1 and Comparative Example 1. Results of this testing are shown in Table 8.

TABLE 8

Flash point and pour point for thermal greases

| Thermal Grease Matrix (Component A) | Flash point, ° C. | Pour point, ° C. |
|---|---|---|
| Ethylene-propylene oligomer | 182 | 0° C. |
| Silicone fluid* | 293.7 | Below −50 (freezer-limited) |

*A 50/50 vol % mixture of Dow Corning 510 ™ fluid (phenylmethyl polysiloxane) having a kinematic viscosity of 100 cSt (0.0001 m²/s) and the same fluid having a kinematic viscosity of 50 cSt (0.00005 m²/s, = 5e−05 m²/s).

B. Example 2a to 2c and Comparative Example 2a' to 2c' are prepared, having the constituencies given in Table 4 and using the methodology described in Example 1 and Comparative Example 1. Table 9 shows formulations and testing results.

TABLE 9

Formulations and performance results of Examples 2a-2c and Comparative Examples 2a'-2c'.

| Volume % | | Example 2 | | | Comparative example 2 | | |
|---|---|---|---|---|---|---|---|
| | | a | b | c | a' | b' | c' |
| Matrix | Hyperbranched ethylene-propylene fluid, (SPAN ™ 85, wt % of fillers) | 33 (1.0) | 25 (1.0) | 25.5 (1.0) | | | |
| | Phenylmethyl polysiloxane | | | | 33 | 25 | 25.5 |
| Filler | AlN (WLS) | 67 | | | 67 | | |
| | Spherical $Al_2O_3$ AX35-125/AX3-75 = 7/3 | | 75 | | | 75 | |
| | Spherical $Al_2O_3$ AX10-32 | | | 59.7 | | | 59.7 |
| | ZnO (D50 = 0.35 µm) | | | 14.8 | | | 14.8 |
| Viscosity (Pa·s) at shear rate of 1.1/s | | 455 | 728 | 1812 | 265 | 110 | 940 |
| Paste-like appearance & dispensing property | | good | good | good | good | good | fair |
| Thermal conductivity (W/mK)* | | 3.30 | 3.36 | 3.08 | 2.93 | 3.17 | 2.93 |

*Watt/meter · Kelvin

It will be seen in Table 9 that inventive Example 2a exhibits a higher thermal conductivity than Comparative Example 2a' when using AlN as the thermally conductive filler. Based on other filler packages, a higher thermal conductivity is also achieved using hyperbranched ethylene-propylene fluid as the matrix than is achieved using phenylmethyl polysiloxane as the matrix. This is shown in Example 2b and 2c, which are compared with Comparative Example 2b' and 2c'.

The invention claimed is:
1. A thermal grease composition comprising an admixture of
   (a) a hyperbranched, ethylene-based or ethylene- and propylene-based, olefinic fluid having an average of at least 1.5 methine carbons per oligomer molecule, and having at least 40 methine carbons per one-thousand total carbons, and
   wherein the average number of carbons per molecule is from 25 to 200; and
   (b) a thermally conductive filler.

2. The thermal grease composition of claim 1, wherein the hyperbranched, ethylene-based or ethylene-and-propylene-based olefinic fluid exhibits at least one of
   (a) a flash point of 180° C. or higher, as measured according to ASTM D-93;
   (b) a pour point of zero ° C. or lower, as measured according to ASTM D-97;
   (c) a kinematic viscosity at 40° C., as measured according to ASTM D-445, of no more than 0.0002 meter squared per second; and
   (d) a combination thereof.

3. The thermal grease composition of claim 1 wherein the ethylene-based or ethylene- and propylene-based fluid further comprises an alpha-olefin comonomer other than propylene.

4. The thermal grease composition of claim 1 wherein the thermally conductive filler is selected from beryllium oxide, aluminum nitride, boron nitride, aluminum oxide, zinc oxide, magnesium oxide, silicon carbide, silicon nitride, silicon dioxide, and zinc sulfide; solid metal particles, selected from silver, copper and aluminum; carbon materials, selected from diamond powder; carbon fibers, carbon nanotubes, carbon black, graphite, graphene and graphene oxide; liquid metals, selected from gallium-based alloys; and combinations thereof.

5. The thermal grease composition of claim 1 further comprising a phase segregator, a surfactant, a flame retardant, an antioxidant, a coupling agent, a bleed inhibiting agent, a rheology modifier, a filler, or a combination thereof.

6. The thermal grease composition of claim 5 wherein the phase segregator is a compound selected from polydimethylsiloxane; phenylmethyl polysiloxane; hydroxy-terminated polydimethyl-siloxane; polydimethyldiphenylsiloxane; polydiphenylsiloxane; methylalkyl polysiloxanes containing an alkyl group selected from a naphthyl group, an ethyl group, a propyl group, or an amyl group; and combinations thereof.

7. A process to prepare a thermal grease composition comprising
   (a) contacting together ethylene, and optionally propylene, and further optionally, an alpha-olefin,
   and at least one coordination-insertion catalyst,
   wherein the coordination-insertion catalyst is a metal-ligand complex wherein the metal is selected from zirconium, hafnium and titanium,
   and has an ethylene/octene reactivity ratio up to 20, and a kinetic chain length up to 20 monomer units;
   in a continuously-fed backmixed reactor zone under conditions such that a mixture of at least two products is formed, the mixture including
      (i) a hyperbranched oligomer
      having an average of at least 1.5 methine carbons per oligomer molecule,
      and having at least 40 methine carbons per one-thousand total carbons, and
      wherein at least 40 percent of the methine carbons is derived from the ethylene or, where the optional propylene is included, from the ethylene and the propylene, and
      wherein the average number of carbons per molecule is from 25 to 200; and
      (ii) at least one organic volatile product having an average number of carbons per molecule that is less than or equal to 14;
   (b) separating the hyperbranched oligomer from the organic volatile product;
   (c) recovering the hyperbranched oligomer; and
   (d) admixing the hyperbranched oligomer and a thermally conductive filler to form a thermal grease composition.

* * * * *